(12) United States Patent
Veracini

(10) Patent No.: US 11,083,240 B2
(45) Date of Patent: Aug. 10, 2021

(54) SPORT FOOTWEAR WITH IMPROVED STRUCTURE

(71) Applicant: Marco Veracini, Castelfiorentino (IT)

(72) Inventor: Marco Veracini, Castelfiorentino (IT)

( * ) Notice: Subject to any disclaimer, the term of this patent is extended or adjusted under 35 U.S.C. 154(b) by 42 days.

(21) Appl. No.: 16/630,341

(22) PCT Filed: Jul. 13, 2018

(86) PCT No.: PCT/IB2018/055207
§ 371 (c)(1),
(2) Date: Jan. 10, 2020

(87) PCT Pub. No.: WO2019/012498
PCT Pub. Date: Jan. 17, 2019

(65) Prior Publication Data
US 2021/0145110 A1 May 20, 2021

(30) Foreign Application Priority Data
Jul. 13, 2017 (IT) .......................... 102017000079230

(51) Int. Cl.
*B05B 9/00* (2006.01)
*B05B 12/00* (2018.01)
(Continued)

(52) U.S. Cl.
CPC .............. *A43B 3/0005* (2013.01); *B05B 9/00* (2013.01); *B05B 12/00* (2013.01); *H04B 1/0343* (2013.01); *A43B 5/02* (2013.01)

(58) Field of Classification Search
None
See application file for complete search history.

(56) References Cited

U.S. PATENT DOCUMENTS 4,873,774 A * 10/1989 Lafever .................. A43C 15/14
36/61
5,564,201 A * 10/1996 O'Connell ............... A43B 3/00
36/112
(Continued)

FOREIGN PATENT DOCUMENTS

GB 2522692 * 8/2015 ............... A43B 3/00
KR 20020062114 7/2002

OTHER PUBLICATIONS

International Search Report dated Oct. 12, 2018.
(Continued)

*Primary Examiner* — John F Mortell
(74) *Attorney, Agent, or Firm* — Preston Smirman; Smirman IP Law, PLLC

(57) ABSTRACT

A sport footwear is provided with a tank containing a pressure timed evanescence marker fluid, an opening, from which the liquid is spouted, associated with the tank and regulated by a check valve, electromechanical actuation means comprising a wireless receiving card, suitable for imposing the opening condition of the check valve and actuable by means of remote control means comprising at least one wireless network card. Between the wireless network card and the wireless receiving card a wireless type connection is established, suitable for connecting the control means with the actuation means and for setting the opening condition in the check valve in order to achieve the pressure liquid to be spouted from the opening of the footwear.

9 Claims, 2 Drawing Sheets

(51) Int. Cl.
*A43B 5/00* (2006.01)
*A43B 3/00* (2006.01)
*H04B 1/034* (2006.01)
*A43B 5/02* (2006.01)

(56) References Cited

U.S. PATENT DOCUMENTS

| | | | | |
|---|---|---|---|---|
| 6,014,823 | A * | 1/2000 | Lakic | A41D 19/01523 36/11.5 |
| 2006/0282017 | A1* | 12/2006 | Avni | A61B 5/22 600/587 |
| 2008/0167580 | A1* | 7/2008 | Avni | A43D 1/00 600/587 |
| 2009/0313853 | A1* | 12/2009 | Tadin | B32B 5/26 36/91 |
| 2014/0165427 | A1* | 6/2014 | Molyneux | A43B 21/26 36/102 |

OTHER PUBLICATIONS

Written Opinion of International Searching Authority dated Oct. 12, 2018.
International Preliminary Report on Patentability dated Jan. 14, 2020.
English Abstract of KR20020062114.

* cited by examiner

SPORT FOOTWEAR WITH IMPROVED STRUCTURE

CROSS-REFERENCE TO RELATED APPLICATION

The instant application is a national phase of PCT International Application No. PCT/IB2018/055207, filed Jul. 13, 2018, and claims priority to Italian Patent Application Serial No. 102017000079230, filed Jul. 13, 2017, the entire specifications of both of which are expressly incorporated herein by reference.

TECHNICAL FIELD

The present invention is inserted within the sector of sports accessories and more precisely of football referees footwears. Within this sector, the invention is proposed as an integration between a footwear and a technical support accessory tool.

STATE OF THE ART

Today, professional football referees are equipped with a specific spray can for marking temporary lines on the grass of the playing field. This can, hold hooked on one side of the referee's shorts with a special elastic cord, is used by the same when it is necessary to mark a certain distance or a certain point so that it remains clearly visible by the players on the field. This instrument, after a necessary period of testing, has become mandatory for professional referees and the tracing of a foamy line on the grass has become an ordinary gesture during a football match.

Tracing a line on the grass requires, necessarily, that the referee bends to the ground for using said can and marking superficially the field's grass. This gesture, even in its simplicity, is repeated many times during a match and, considering the effort that referees sustain almost constantly being in motion (and very often running) for all 90' of the match, can represent, especially in moments of greater weariness at the end of the match, an annoying effort. Moreover, during the referee gesture, is forced to lose the sight of the game scenario and therefore the players' behavior.

Therefore, given the inescapability of marking lines and reference points on the ground, it is desirable to develop an alternative method for marking the field that may require as least effort as possible and that allows the referee not to be forced to hold an object that, even if small, is still bulky. It would be desireable for the marker substance to be contained within a tank, not bulky, wearable or in any case integrable to an accessory already used by the referee himself.

Below are briefly cited two previous patent documents concerning techniques for the integration of tanks containing pressurized liquids into footwears or wearable accessories; the invention proposed in this patent, however, intends to solve different technical problems with different technical solutions, as will be apparent from the following description.

In the prior art document GB2522692 it is protected a footwear provided with a personal defense spray system comprising a tank, inside which a pressurized liquid is contained, housed inside the rear heel, as well as suitable organs for the actuation, passage and expulsion of the liquid itself in a nebulized and pressurized form. The mechanism is actuated by breaking the tank by means of a forced hit to the heel of the footwear with a consequent pressure escape of the liquid through the atomized expulsion members.

In the earlier document KR20020062114 it is protected a footwear containing a water spraying device capable of spraying the water sent from a storage container, worn on any portion of the user's body. The footwear comprises a tank, a nozzle, a water supply pipe, a pressure means for spraying the water through the nozzle and opening and closing means for controlling the spray of water. The opening and closing means contain a cylinder, a check valve, a ball for draining the water outside in the cylinder and an elastic element.

Both the aforementioned patent documents describe, singularly, some partial aspects of the present invention aiming, in any case, completely different objects from it.

SUMMARY OF THE INVENTION

The object of the present invention is therefore to provide a sport footwear with an improved structure which can overcome the problems of the prior art mentioned above.

Another object of the present invention is to provide a sport footwear with an improved structure that can be used to assist football referees when it is necessary to temporarily mark lines and points on the field.

A further object of the present invention is to provide a sport footwear with an improved structure that can exempt the football referee from having to bend to the ground whenever he is requested to mark the field.

Another object of the present invention is to provide a sport footwear with an improved structure that can mark the ground on condition and that this condition can be manually adjustable remotely by the referee himself.

These and other objects of the present invention are achieved by means of a sport footwear provided with at least one tank containing a pressure substance and characterized in that it comprises at least one opening regulated by a check valve and electromechanical actuation means, suitable for setting the opening condition of the check valve, comprising motorizing means, energy storage means and a wireless receiving card. The footwear is also characterized in that the electromechanical actuation means can be remotely operated by means of remote control means, suitable for setting the opening condition in the check valve, comprising a wireless network card suitable for establishing a wireless connection with the wireless receiving card. The footwear is further characterized by the fact that the pressure substance is a timed evanescence marker liquid suitable to be spouted from the opening in the event of opening condition of the check valve.

Advantageously, the remote control means can be manually operated by means of the input buttons of a watch that can be remotely connected univocally to the footwear.

Alternatively, remote control means can be manually operated by means of a button that can be remotely connected univocally to the footwear and is suitable for being stationary placed on a wearable accessory.

Still advantageously, the footwear comprises connection means suitable for allowing the passage of the pressure substance from the tank to the opening.

A further advantage consists in the fact that the tank is replaceable with a tank of the same.

Alternatively, the tank is suitable to be charged externally with the pressure substance.

Advantageously, the wireless network card connects to the wireless receiving card by means of a wireless connection of the Bluetooth-type.

Still advantageously, the energy storage means are rechargeable batteries.

BRIEF DESCRIPTION OF THE DRAWINGS

These and other advantages and characteristics associated with the footwear of the present invention, will become, however, more easily understood through the illustration of non-limiting exemplifying embodiments, as described below with the aid of the enclosed drawings, in which:
1.

DESCRIPTION OF THE PREFERRED EMBODIMENTS

Figure 2:
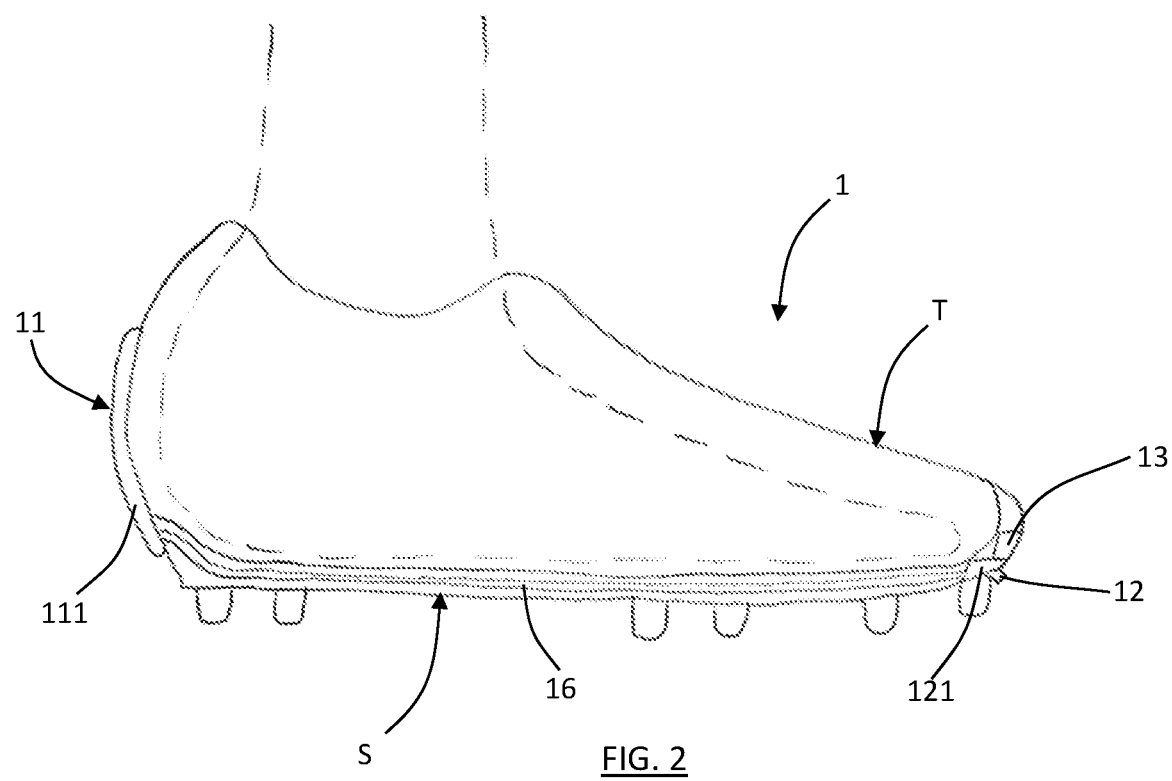
FIG. 2 shows a side section of the embodiment of FIG. 1;
3.
Figure 1:
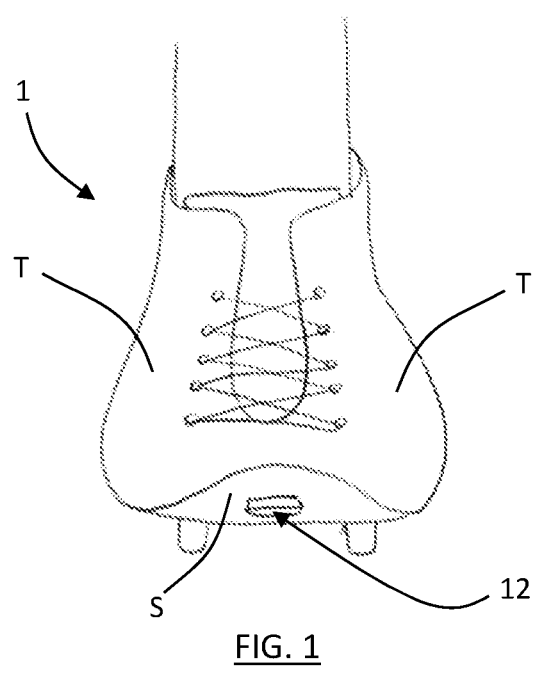
FIG. 1 shows a front view of an embodiment of the invention;
2.

With reference to FIG. 1, a sport game footwear, 1, commonly used also by football referees, includes an upper, T, provided with lacing strings, and a sole, S, joined to said upper T along its profile, on which they can be inserted in a removable way or can be obtained some cleats. Said footwear 1, as evident in FIG. 2, is provided with a small tank, 11, filled with a pressure substance, 111, of the timed evanescence marker type, externally fixed to the upper T in the area behind it, while at the front, near the tip of the sole S, there is an opening, 12, connected, inside the footwear 1, to said tank 11 with connection means, 16. Said opening 12 is regulated in its operation by a check valve 121, as well operated by electromechanical actuation means 13, suitable for opening and closing on condition said check valve 121, and is adapted to spout said pressure substance 111 according to a predetermined direction. Said electromechanical actuation means 13 are located, in the hypothesis of greater comfort, inside the footwear 1, in the vicinity of said opening 12, and, presumably, comprise motorizing means, 131, the check valve 121, energy storage means, 132, of the rechargeable battery type, suitable for supplying said motorizing means 131, and at least one wireless receiving card 133, supplied by said energy storage means 132, and adapted to establish a remote connection with adjustment and control accessories. The tank 11 is also suitable to be filled and recharged with said pressure substance 111 by means of suitable instruments able to penetrate said tank 11 through a dedicated valve present on its outer surface. This way, at the end of a match or whenever necessary, it is possible to return tank 11 to the fullness regime and ensure the sufficient quantity of pressure substance 111 for at least one whole match. The energy storage means 132, of the rechargeable battery type, can be connected by means of suitable charging cables, to an external current supply source. This feature, together with the possibility of also recharging the tank 11, makes the footwear 1 durable and economical in the long term.

Figure 3:
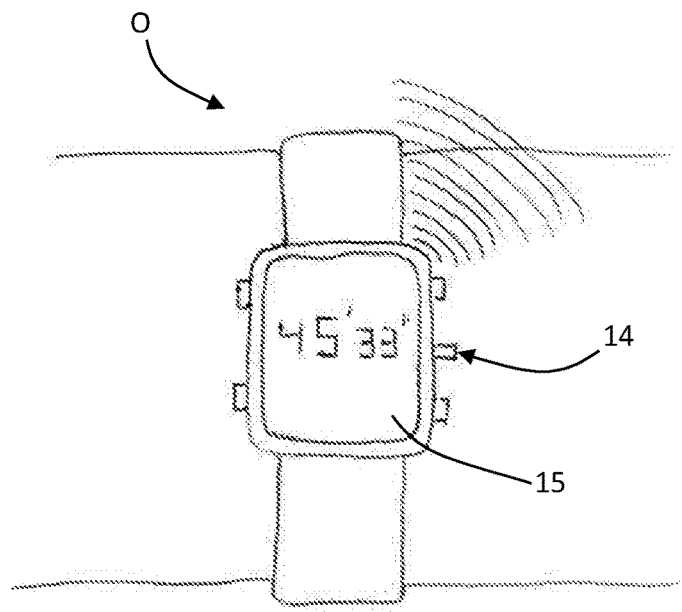
FIG. 3 shows a top view of an accessory of an embodiment of the invention;
4.

FIG. 3 shows a clock, O, accessory of the embodiment of the invention, provided with suitable control means, 14, of the push-button type, which can be activated by pressure and suitable for operating remotely, by means of a wireless network card, 15, inside said clock O and univocally connected to the wireless receiving card 133 of the footwear 1, said electromechanical actuation means 13 of the footwear 1 itself. The wireless connection established between the wireless network card 15 and the wireless receiving card 133 is preferably of the Bluetooth type, but connections of the wi-fi type, infrared etc. are still valid and effective, provided they are always of the wireless type.

Figure 4:
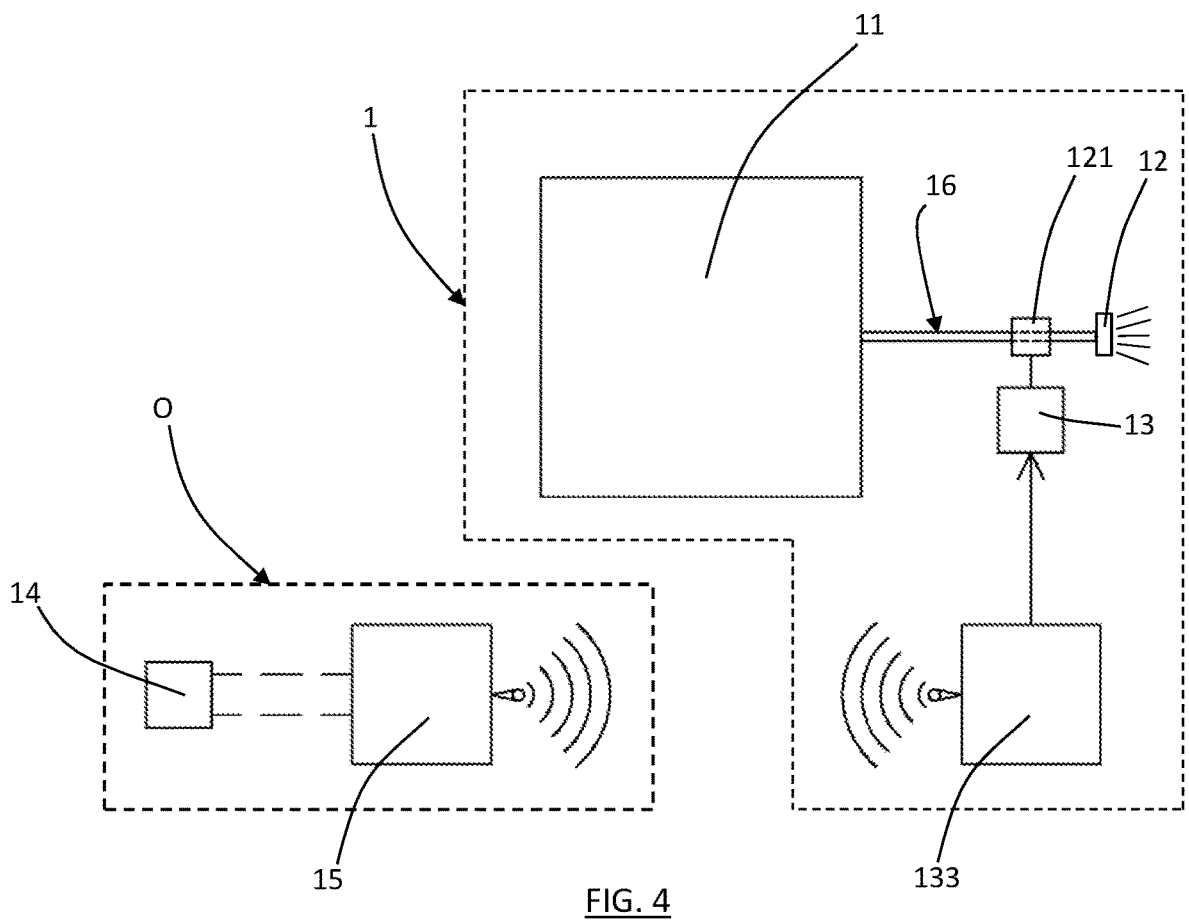
FIG. 4 shows a functional diagram of an embodiment of the invention.

FIG. 4 schematically shows the assembly of the elements included within the embodiment of the invention and clarifies the operating mechanism thereof. It is highlighted how a remote accessory, in this case the clock O, is able to communicate by means of the wireless network card 15, driven by the control means 14, with the wireless receiving card 133 of the electromechanical actuation means 13 contained within the footwear 1. The control means 15 can be activated by pressing the specific button present in the clock O, as weel as the other control buttons already existing in the clock O itself. The electromechanical actuation means 13, once the control signal is received, trigger the actuation of the check valve 121 which opens the passage of the pressure substance 111 allowing the jet spout through the opening 12. This way the pressure substance 111 is spout from the footwear 1 towards the surface of the playing field and it is thus allowed the referee to mark points or lines on the same field without having to bend to the ground and without having to use additional tools to be hold for all the time of match. This embodiment also makes it much easier to send the command, since the clock O is a necessary tool, always present at the wrist of a referee. The pressure substance 111 spout on the surface of the playing field, as previously specified, is of the timed evanescence marker type and for this reason its durability on the field is no more than about one minute.

In a variant embodiment of the invention described above, the accessory on which the remote control means are installed is a simple button provided with a suitable wireless network card for the communication with the wireless receiving card present inside the footwear. The button is simply housed on any of the clothes the referee wears during the match. It can therefore be directly located on the shirt, on the shorts, on a wrist strap or even on the small register kept in the pocket. In this variant embodiment, like the previous one, the referee must simply press the button when the marking of the ground is requested and keep the tip of the footwear with the opening facing the surface of the field.

An advantageous variant embodiment of the invention described above provides for the possibility of removing and replacing the tank with one of the same type. This way, when the tank is empty or does not have enough pressure substance to start a new match, the empty tank is replaced by a full tank without having to resort to additional external equipment to carry out the recharge. This feature therefore allows the referees themselves to be able to easily carry out the replacement in complete autonomy. In this case the tank is provided with quick coupling and releasing elements to the body of the footwear which can advantageously be of a pressure type.

In a further variant embodiment, the connection means between the tank and the opening are located outside the footwear and more precisely below the outer profile of the sole. This way, it is exploited the available space between the playing field and the lower profile of the sole, thus existing thanks to the fact that the footwear cleats allow it to remain slightly raised with respect to the ground. Alternatively, the passage of the connection means always takes place outside the footwear but superficially along the upper.

In a further variant of the described embodiment, the tank is located at the front near the tip of the footwear and the opening is located on the outer surface of the tank in such a way that the connection means are not necessary but instead it is possible to spout the pressure substance directly from the tank through the opening itself. The latter remains in any case operated by the same check valve, which can be controlled by the same electromechanical actuation means, remotely controlled by the control elements themselves, and communicated with them always in wireless mode. In this embodiment, less cumbersome and more economical, each element of the invention installed on the footwear is located near the tip, and therefore it is allowed greater freedom in use and in the eventual decoration of the footwear.

In a variant embodiment there is a specific application inside the clock software for the management and real-time display of the quantity of pressure substance present inside the tank. This way the referee is able to immediately know the pressure substance level and then evaluate a possible recharge of the same.

The above and further variations and modifications of practical application nature may of course be provided, while still remaining within the scope of protection defined by the claims below.

The invention claimed is:

1. A sport footwear having at least one tank containing a pressure substance, comprising:
   at least one opening associated with the tank regulated by a check valve; and
   electromechanical actuation means adapted to set an opening condition of the check valve;
   wherein the electromechanical actuation means are controllable through remote control means comprising at least one wireless network card operable for establishing a wireless connection with a wireless receiving card and for setting the opening condition in the check valve;
   wherein the pressure substance is a timed evanescence marking liquid operable to be spouted from the opening.

2. The footwear according to claim 1, wherein the electromechanical actuation means comprises any one of motorizing means, energy storage means and a wireless receiving card.

3. The footwear according to claim 1, wherein the remote control means are manually actuable by means of input buttons of a watch, the watch being remotely connectable univocally to the footwear.

4. The footwear according to claim 1, wherein the remote control means are manually actuable by means of a button, the button being remotely connectable univocally to the footwear and being operable to be stationary placed on a wearable accessory.

5. The footwear according to claim 1, further comprising connection means adapted to allow the passage of the pressure substance from the tank to the opening.

6. The footwear according to claim 1, wherein the tank is removable so that when emptied it can be replaced with a new full tank.

7. The footwear according to claim 1, wherein the tank is operable to be charged externally with the pressure substance.

8. The footwear according to claim 1, wherein the wireless network card connects to the wireless receiving card by means of a wireless connection of the BLUETOOTH-type.

9. The footwear according to claim 2, wherein the energy storage means are rechargeable batteries.

* * * * *